US012280965B2

(12) United States Patent
Zheng et al.

(10) Patent No.: US 12,280,965 B2
(45) Date of Patent: Apr. 22, 2025

(54) INSTANT BEVERAGE PRODUCTION EQUIPMENT

(71) Applicant: KOUBEI (SHANGHAI) INFORMATION TECHNOLOGY CO., LTD., Shanghai (CN)

(72) Inventors: Zhenbin Zheng, Shanghai (CN); Kang Gao, Shanghai (CN); Linhong Chen, Shanghai (CN)

(73) Assignee: KOUBEI (SHANGHAI) INFORMATION TECHNOLOGY CO., LTD., Shanghai (CN)

( * ) Notice: Subject to any disclaimer, the term of this patent is extended or adjusted under 35 U.S.C. 154(b) by 775 days.

(21) Appl. No.: 17/616,078

(22) PCT Filed: Mar. 30, 2020

(86) PCT No.: PCT/CN2020/082170
§ 371 (c)(1),
(2) Date: Dec. 2, 2021

(87) PCT Pub. No.: WO2020/244293
PCT Pub. Date: Dec. 10, 2020

(65) Prior Publication Data
US 2022/0315351 A1     Oct. 6, 2022

(30) Foreign Application Priority Data
Jun. 3, 2019 (CN) .......................... 201910478120.5

(51) Int. Cl.
*B65G 47/90* (2006.01)
*B65G 47/248* (2006.01)

(52) U.S. Cl.
CPC ......... *B65G 47/901* (2013.01); *B65G 47/248* (2013.01)

(58) Field of Classification Search
CPC ........ G07F 11/42; G07F 13/06; G07F 13/065; G07F 13/10; B65G 47/248; B65G 47/901;
(Continued)

(56) References Cited

U.S. PATENT DOCUMENTS

2021/0007556 A1*  1/2021  Delbaere ............. A47J 43/0727

FOREIGN PATENT DOCUMENTS

CN     201911901 U     8/2011
CN     205386080 U     7/2016
(Continued)

OTHER PUBLICATIONS

ISA State Intellectual Property Office of the People's Republic of China, International Search Report Issued in Application No. PCT/CN2020/082170, Jul. 1, 2020, WIPO, 4 pages.
(Continued)

*Primary Examiner* — Hung D Nguyen
(74) *Attorney, Agent, or Firm* — Getech Law LLC; Jun Ye

(57) ABSTRACT

The present disclosure relates to instant beverage production equipment, including: a preparing device configured to prepare drinking ingredients of instant beverages in first cup bodies, and add the prepared drinking ingredients into first cup bodies; a material adding device configured to add chewing ingredients of the instant beverages into second cup bodies, wherein one of the second cup bodies and the first cup bodies are selling cup bodies, and the other are non-selling cup bodies; a conveying device configured to pour the drinking ingredients or the chewing ingredients in the selling cup bodies into the non-selling cup bodies so that the drinking ingredients and the chewing ingredients are mixed into the instant beverages; a control device configured to
(Continued)

coordinately control the preparing device, the material adding device and the conveying device.

19 Claims, 3 Drawing Sheets

(58) Field of Classification Search
CPC .. A47J 43/042; A47J 43/0716; A47J 43/0727; A37J 31/00; A37J 31/40; A37J 31/44; A37J 31/4403; A37J 31/46
See application file for complete search history.

(56) References Cited

FOREIGN PATENT DOCUMENTS

| | | | | | |
|---|---|---|---|---|---|
| CN | 205568717 | U | * | 9/2016 | |
| CN | 107077768 | A | | 8/2017 | |
| CN | 208796363 | U | | 4/2019 | |
| CN | 110203495 | A | | 9/2019 | |
| CN | 210479258 | U | | 5/2020 | |
| CN | 110092212 | B | * | 12/2023 | ............. B65G 65/40 |
| EP | 0199770 | A1 | | 11/1986 | |
| EP | 2189089 | A1 | | 5/2010 | |
| TW | M594913 | U | * | 5/2020 | |

OTHER PUBLICATIONS

ISA State Intellectual Property Office of the People's Republic of China, Written Opinion of the International Searching Authority Issued in Application No. PCT/CN2020/082170, Jul. 1, 2020, WIPO, 8 pages.(Submitted with Machine/Partial Translation).

* cited by examiner

INSTANT BEVERAGE PRODUCTION EQUIPMENT

CROSS REFERENCE TO RELATED APPLICATIONS

The present application is the U.S. national phase application of PCT Application No. PCT/CN2020/082170, filed on Mar. 30, 2020, which claims priority to Chinese patent application No. 2019104781205 entitled "INSTANT BEVERAGE PRODUCTION EQUIPMENT", filed with the Chinese Patent Office on Jun. 3, 2019. The entire contents of the above-referred applications are incorporated herein by reference.

TECHNICAL FIELD

The present disclosure belongs to the field of beverage production technologies, and in particular, to instant beverage production equipment.

BACKGROUND

Instant beverages such as milk tea and fruit tea are popular with people, leading to shops integrating production and sales all over streets and alleys. At present, artificially prepared instant beverages are mainly composed of drinking ingredients and chewing ingredients, but existing instant beverage production equipment such as milk tea machine or milk tea and coffee integrated machine can brew only milk powder and/or tea, and produce instant beverages composed of only drinking ingredients without chewing ingredients.

For example, Chinese invention patent CN107077768A discloses a system for automated food and beverage supply, which can capture order details associated with orders placed by customers for supply of beverages produced by the system. However, this patent does not disclose that the system can produce instant beverages containing drinking ingredients and chewing ingredients.

SUMMARY

In order to solve all or some of the above-mentioned problems, an object of the present disclosure is to provide instant beverage production equipment that can produce instant beverages containing drinking ingredients and chewing ingredients.

The present disclosure provides instant beverage production equipment, including: a preparing device, configured to prepare drinking ingredients of instant beverages in first cup bodies, or prepare drinking ingredients of instant beverages and add the prepared drinking ingredients into first cup bodies; a material adding device, configured to add chewing ingredients of the instant beverages into second cup bodies, wherein one of the second cup bodies and the first cup bodies are selling cup bodies, and the other are non-selling cup bodies; a conveying device, configured to pour the drinking ingredients or the chewing ingredients in the selling cup bodies into the non-selling cup bodies so that the drinking ingredients and the chewing ingredients are mixed into the instant beverages; and a control device, configured to coordinately control the preparing device, the material adding device and the conveying device.

The instant beverage production equipment according to the present disclosure can use the control device to coordinately control the preparing device, the material adding device and the conveying device, so that the preparing device, the material adding device and the conveying device can jointly produce the instant beverages composed of the drinking ingredients and the chewing ingredients. At the same time, the instant beverage production equipment enables an operation on the chewing ingredients and an operation on the drinking ingredients to be performed separately, and then mixes the chewing ingredients and the drinking ingredients into the instant beverages, which can greatly increase the efficiency of preparing the instant beverages, reduce the waiting time of customers and improve the customer experiences.

In addition, the instant beverage production equipment according to the present disclosure has a simple structure, which makes it convenient to produce, safe and reliable to use, and can automatically produce instant beverages according to customer orders, which facilitates implementation of promotion and application.

BRIEF DESCRIPTION OF THE DRAWINGS

In order to more clearly illustrate the specific embodiments of the present disclosure or the technical solutions in the prior art, the drawings that need to be used in the description of the specific embodiments or the prior art will be briefly introduced. In all drawings, similar elements or parts are generally identified by similar reference signs. In the drawings, each element or part is not necessarily drawn according to actual scale.

DETAILED DESCRIPTION OF THE EMBODIMENTS

The embodiments of the technical solutions according to the present disclosure will be described in detail below with reference to the accompanying drawings. The following embodiments are used only to explain the technical solutions of the present disclosure more clearly, and therefore are used only as examples, but cannot be used to limit the protection scope of the present disclosure.

Figure 1:
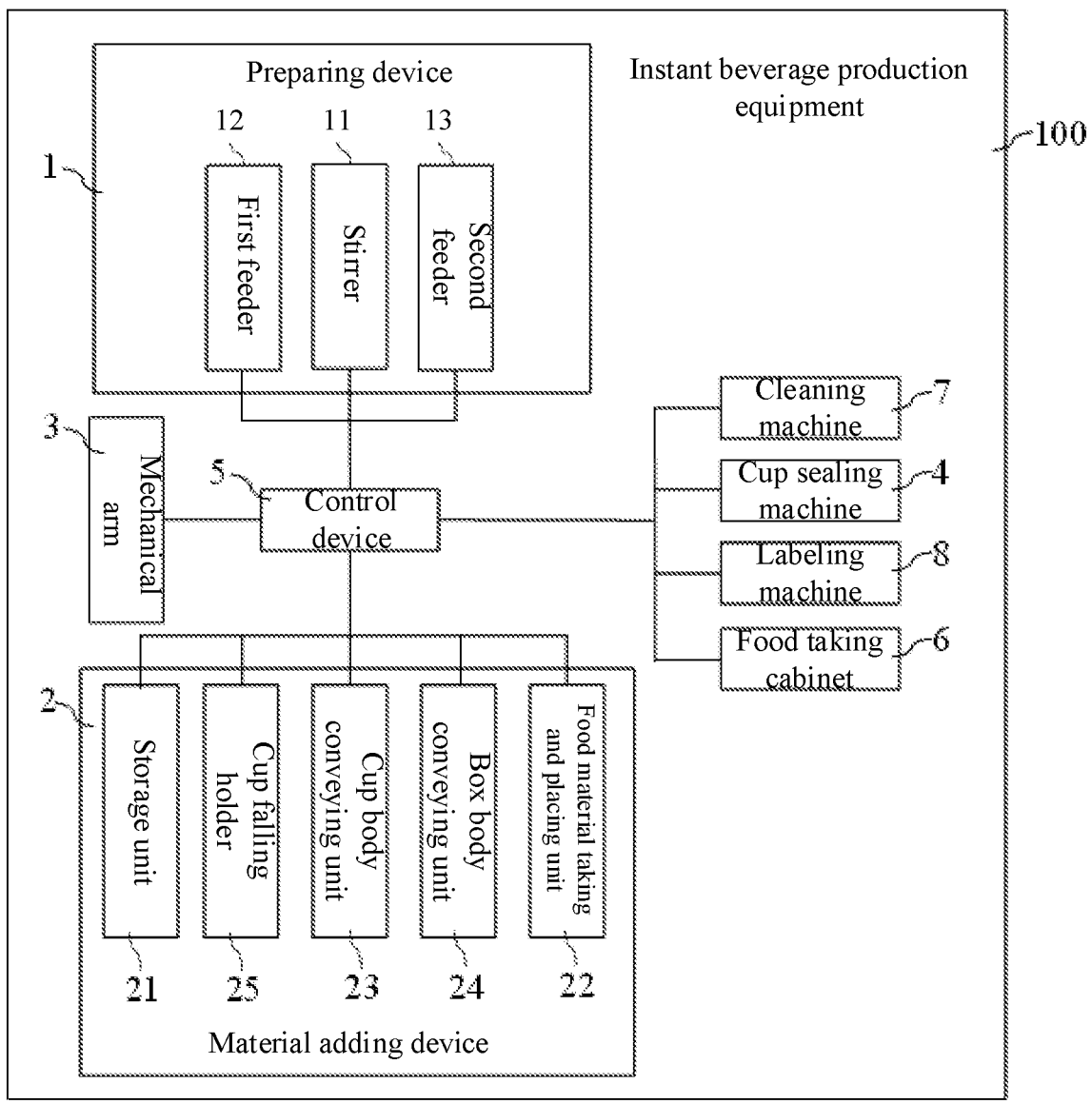
FIG. 1 is a block diagram illustrating a functional structure of instant beverage production equipment according to an embodiment of the present disclosure.
Figure 2:
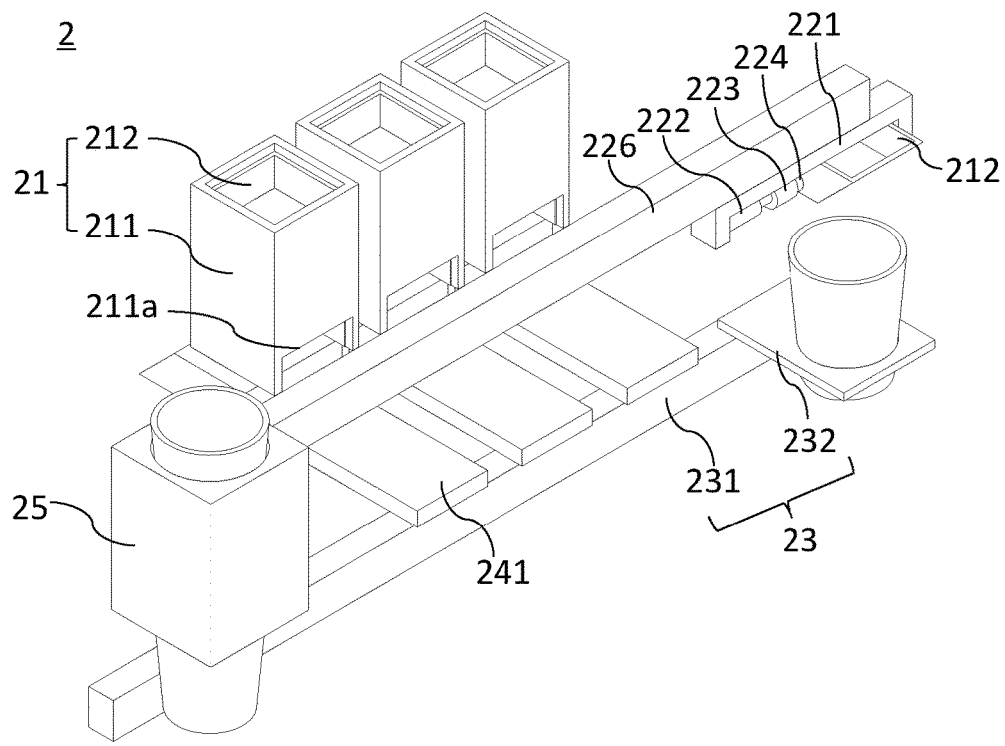
FIG. 2 is a perspective view illustrating a material adding device of the instant beverage production equipment shown in FIG. 1.

FIG. 1 is a block diagram illustrating a functional structure of instant beverage production equipment according to an embodiment of the present disclosure. As shown in FIG. 1, instant beverage production equipment 100 is used to prepare instant beverages, which are mainly composed of drinking ingredients and chewing ingredients, such as milk tea or fruit tea with chewing ingredients. In this embodiment, milk tea is selected as instant beverages, drinking ingredients of which are usually milk tea soup mixed with milk (milk powder or liquid milk), tea (tea powder or leaf-free tea water) and water, and chewing ingredients of which are tapioca balls or fruit pulp particles, etc. In an alternative embodiment, when fruit tea is selected as instant beverages, drinking ingredients of which are usually leaf-free tea soup brewed with tea powder or tea leaves, and chewing ingredients of which are fruit pulp particles, etc.

The instant beverage production equipment 100 includes a preparing device 1, a material adding device 2, a conveying device (for example, a mechanical arm 3), and a control device 5 capable of coordinately controlling the preparing device 1, the material adding device 2 and the conveying device. The preparing device 1 can prepare drinking ingredients of instant beverages in first cup bodies, or prepare drinking ingredients of instant beverages in its interior and add the prepared drinking ingredients into first cup bodies. The material adding device 2 can add chewing ingredients of the instant beverages into second cup bodies. One of the second cup bodies and the first cup bodies are selling cup bodies, and the other are non-selling cup bodies. In this embodiment, the second cup bodies are selected as the selling cup bodies, and the first cup bodies are selected as the non-selling cup bodies. Paper cups, glass cups or steel cups can be selected as both the selling cup bodies and the non-selling cup bodies. However, low-cost paper cups are recommended as the selling cup bodies, and steel cups that are not fragile and suitable for reuse are recommended as the non-selling cup bodies, in order to reduce production costs. The conveying device can add contents (i.e., the drinking ingredients or the chewing ingredients) in the selling cup bodies into the non-selling cup bodies so that the drinking ingredients and the chewing ingredients are mixed into the instant beverages, and then convey the selling cup bodies containing the instant beverages to designated beverage taking positions.

The instant beverage production equipment 100 uses the control device 5 to coordinately control the preparing device 1, the material adding device 2 and the conveying device, so that the preparing device 1, the material adding device 2 and the conveying device can jointly produce the instant beverages composed of the drinking ingredients and the chewing ingredients. At the same time, the instant beverage production equipment 100 enables an operation on the chewing ingredients and an operation on the drinking ingredients to be performed separately, and then mixes the chewing ingredients and the drinking ingredients into the instant beverages, which can greatly increase the efficiency of preparing the instant beverages, reduce the waiting time of customers and improve the customer experiences.

Known milk tea machine or milk tea and coffee integrated machine can be selected as the preparing device 1. However, in this embodiment, the preparing device 1 includes a stirrer 11, a first feeder 12 and a second feeder 13. When the conveying device places the first cup bodies in a feeding area of the first feeder 12, the control device 5 controls the first feeder 12 to add a first selected raw material of stored drinking ingredients into the first cup bodies. When the conveying device places the first cup bodies in a feeding area of the second feeder 13, the second feeder 13 is controlled to add a second selected raw material of the stored drinking ingredients into the first cup bodies. When the conveying device places the first cup bodies in a stirring area of the stirrer 11, the stirrer 11 stirs the first selected raw material and the second selected raw material in the first cup bodies so that they are mixed into the drinking ingredients. In this embodiment, liquid milk or milk powder is recommended as the first selected raw material, tea soup is recommended as the second selected raw material, and their mixture is milk tea soup. In an alternative embodiment, milk tea powder is recommended as the first selected raw material, water is recommended as the second selected raw material, and their mixture is milk tea soup. In an alternative embodiment, milk soup is recommended as the first selected raw material, tea is recommended as the second selected raw material, and their mixture is milk tea soup.

A device combined by a cup body conveying mechanism and a cup body rotating mechanism, or the mechanical arm 3 can be selected as the conveying device. In this embodiment, the conveying device is the mechanical arm 3, which can selectively grab the first cup bodies or the second cup bodies, and after placing them at target positions, release them. For details, reference may be made to the following description.

The control device 5 includes an apparatus capable of realizing centralized control, such as a computer. In this embodiment, the control device 5 includes a receiving module (such as a WiFi module, an Internet module, a Bluetooth module or an infrared module) capable of receiving customer orders, and a processing module (such as a CPU) for coordinately controlling the preparing device 1, the material adding device 2 and the conveying device according to the orders to jointly produce instant beverages matching the orders.

The instant beverage production equipment 100 further includes a cup sealing machine 4 connected to the control device 5 and configured to attach packaging films to cup rims of selling cup bodies containing instant beverages. Thus, the control device 5 can control the cup sealing machine 4 to seal the cup rims of the selling cup bodies placed therein to prevent the instant beverages from flowing out of the selling cup bodies. The selling cup bodies containing the instant beverages can be conveyed to a labeling machine 8 by the mechanical arm 3 or by existing cup body conveyor or even by shop assistants.

The instant beverage production equipment 100 further includes a labeling machine 8 connected to the control device 5 and capable of attaching selected labels to the selling cup bodies. In this way, the control device 5 enables the labeling machine 8 to label the selling cup bodies placed therein to indicate necessary information such as order numbers, beverage names and production dates. The selling cup bodies can be conveyed to the labeling machine 8 by the mechanical arm 3 or by the existing cup body conveyor or even by the shop assistants.

The instant beverage production equipment 100 further includes a food taking cabinet 6 with storage space and configured to accommodate the selling cup bodies containing the instant beverages. The food taking cabinet 6 is, for example, a known smart food taking cabinet 6 so that customers can open a cabinet door to take food by means of passwords and scanning. The selling cup bodies can be conveyed to a cleaning machine 7 by the mechanical arm 3 or by the cup body conveyor or even by the shop assistants.

The instant beverage production equipment 100 further includes a cleaning machine 7 connected to the control device 5 and configured to clean the non-selling cup bodies. The control device 5 controls the cleaning machine 7 to clean the non-selling cup bodies placed therein so that the non-selling cup bodies can be reused. The cleaning machine 7 is preferably a spray-type cleaning machine, a high-pressure steam cleaning machine, or the like. The non-selling cup bodies can be conveyed to the cleaning machine 7 by the mechanical arm 3 or by the cup body conveyor or even by the shop assistants.

As shown in FIGS. 2 to 5, the material adding device 2 includes a storage unit 21, and a cup falling holder 25, a cup body conveying unit 23, a box body conveying unit 24 and a food material taking and placing unit 22 controlled by the control device 5. The storage unit 21 is used to store food materials, such as chewing ingredients of instant beverages. The cup falling holder 25 is used to store and release the second cup bodies. The cup body conveying unit 23 is used to receive the second cup bodies released by the cup falling holder 25 and convey them to a material placing area 22b of the food material taking and placing unit 22. The box body conveying unit 24 can take box bodies 212 out of box placing openings 211a of stock bins 211 and convey them to a material taking area 22a of the food material taking and placing unit 22. The food material taking and placing unit 22 can convey the box bodies 212 from its material taking area 22a to its material placing area 22b and pour out chewing ingredients in the box bodies 212. Since the material adding device 2 contains the chewing ingredients through the box bodies 212 and directly controls the box bodies 212 with the chewing ingredients to complete material adding operation, the material adding device can effectively prevent the chewing ingredients from contacting other parts of the material adding device 2 and reduce the number of parts to be cleaned, which enables the purpose of reuse to be achieved by shop assistants cleaning only the box bodies.

Figure 4:
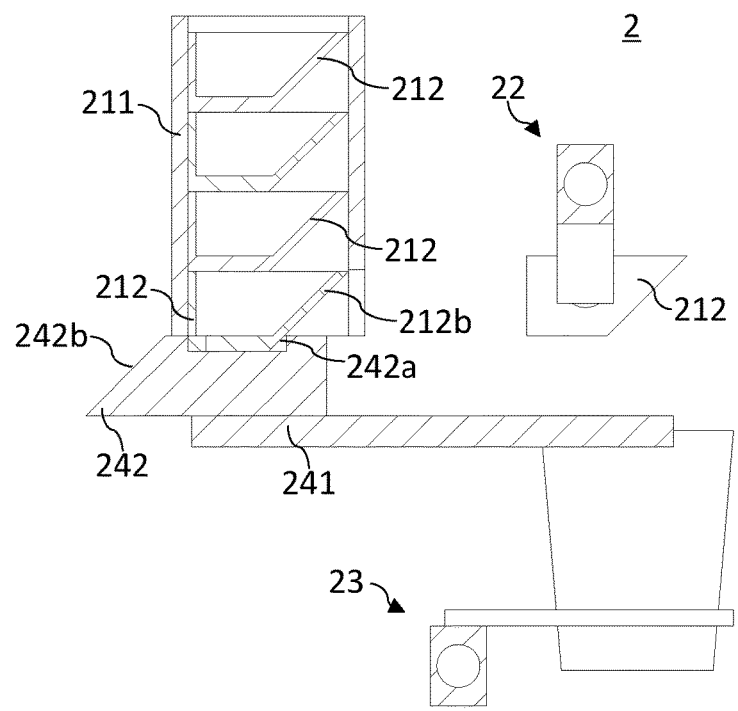
FIG. 4 is a cross-sectional view taken along line A-A in FIG. 3.
Figure 5:
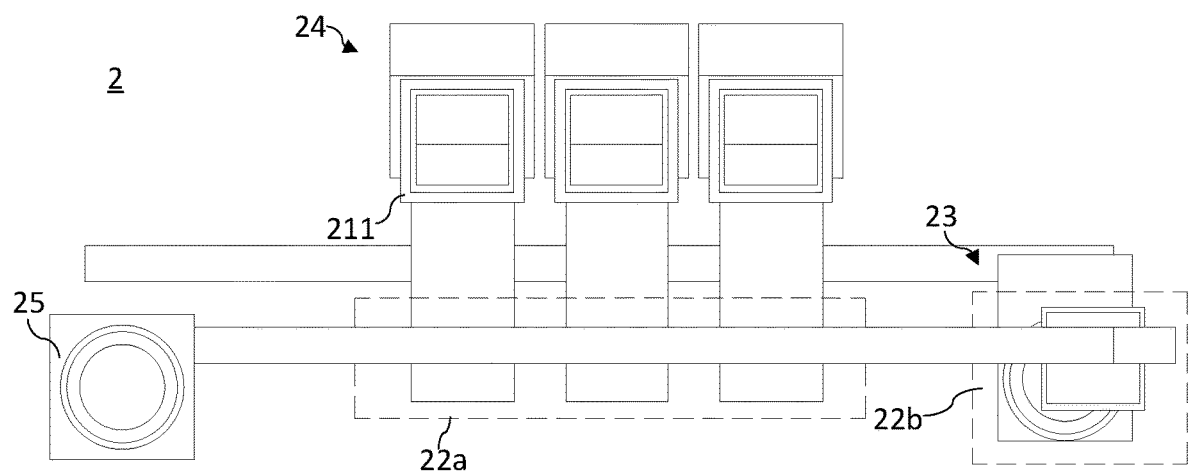
FIG. 5 is a top view illustrating the material adding device of the instant beverage production equipment shown in FIG. 1.

In this embodiment, the storage unit 21 includes stock bins 211 with box placing openings 211a, and box bodies 212 that can be placed in the stock bins 211 and configured to contain food materials. It is preferable that there are a plurality of stock bins 211, and several box bodies 212 are stacked in each stock bin 211, as shown in FIG. 4. Different stock bins 211 can be used to contain different chewing ingredients so that instant beverages with different tastes can be produced. Both top portions and bottom portions of the stock bins 211 are open. The open top portions are used to be placed with the box bodies, and the open bottom portions are used to facilitate the box body conveying unit 24 to control the box bodies 212. Specifically, the stock bins 211 may be cylindrical or prismatic cavities. The box bodies 212 may be configured into circular or polygonal opened boxes. In the preferred embodiment shown in FIG. 2, the stock bins 211 are quadrangular prismatic cavities, and the box bodies 212 are configured into opened boxes with a right-angled trapezoid on their side surfaces.

In this embodiment, the cup body conveying unit 23 includes a first linear driving mechanism 231, and a bracket 232 driven by the first linear driving mechanism 231 and configured to support the second cup bodies. The first linear driving mechanism 231 may be a hydraulic cylinder, a pneumatic cylinder, a linear motor, a crank and connecting rod mechanism driven by a motor, or the like.

Figure 3:
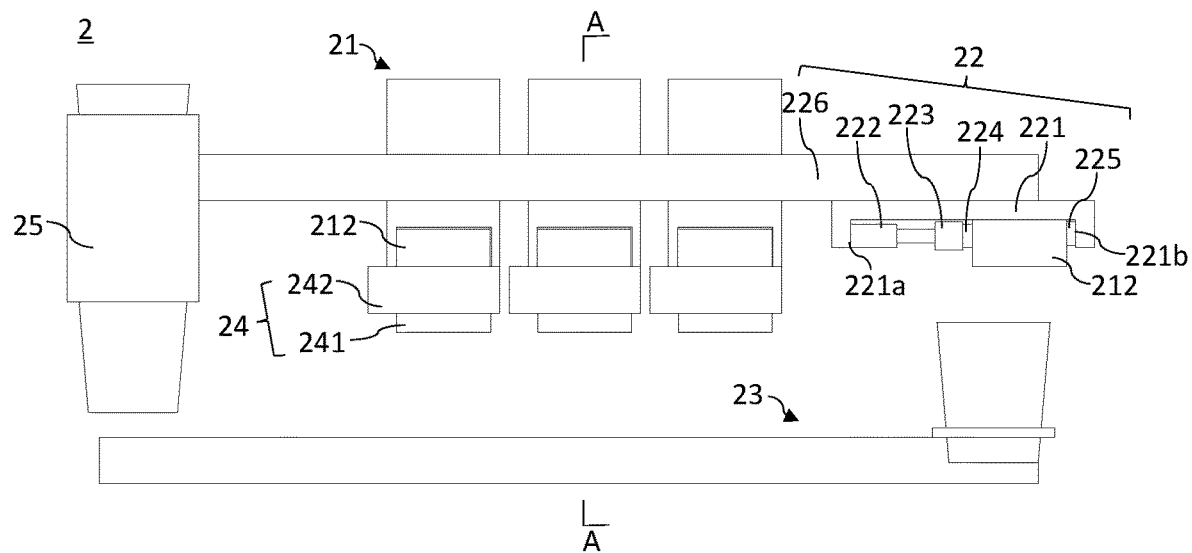
FIG. 3 is a front view illustrating the material adding device of the instant beverage production equipment shown in FIG. 1.

In this embodiment, the box body conveying unit 24 includes sliders 242 configured to carry the box bodies 212, and a third linear driving mechanism 241 that can drive the sliders 242 to take away the box bodies 212 from the stock bins 211 and convey them to the material taking area 22a of the food material taking and placing unit 22, as shown in FIG. 3. The third linear driving mechanism 241 can be a hydraulic cylinder, a pneumatic cylinder, a linear motor, a crank and connecting rod mechanism driven by a motor, or the like.

As shown in FIG. 4, in order to prevent the box bodies 212 from falling off from top portions of the sliders 242, falling-off preventing members 242a can be provided on the top portions of the sliders 242. The falling-off preventing members 242a are preferably slots, magnets or the like. When the falling-off preventing members 242a are the slots, the slots can accommodate bottom portions of the box bodies 212 and prevent them from separating from the sliders 242 when the sliders 242 are moving. When the falling-off preventing members 242a are magnets, the magnets can firmly attract the box bodies 212 onto the top portions of the sliders 242 and prevent them from separating from the sliders 242 when the sliders 242 are moving.

In this embodiment, the food material taking and placing unit 22 specifically includes a flip-type clamping assembly (for example, including a component 221, a component 222, a component 223, a component 224, and a component 225) capable of clamping and flipping the box bodies 212, and a second linear driving mechanism 226 capable of driving the flip-type clamping assembly to reciprocate between the material placing area 22b and the material taking area 22a. The second linear driving mechanism 226 can be a hydraulic cylinder, a pneumatic cylinder, a linear motor, a crank and connecting rod mechanism driven by a motor, or the like.

In this embodiment, the flip-type clamping assembly includes a groove-type member 221 driven by the second linear driving mechanism 226, and a fourth linear driving mechanism 222, a flipping mechanism 223, a first top block 224 and a second top block 225 installed in a groove opening of the groove-type member 221, as shown in FIG. 3. The second top block 225 is rotatably connected with one inner side wall 221a of the groove-type member 221. The fourth linear driving mechanism 222 is connected with another inner side wall 221b of the groove-type member 221. The first top block 224 is connected with the fourth linear driving mechanism 222 via the flipping mechanism 223. The fourth linear driving mechanism 222 can drive the first top block 224 through the flipping mechanism 223 to move toward the second top block 225 and urge the first top block 224 and the second top block 225 to jointly clamp the box bodies 212. The flipping mechanism 223 can drive the first top block 224 to rotate and urge the box bodies 212 clamped by the first top block 224 and the second top block 225 to flip so as to pour out the chewing ingredients in the box bodies 212. The fourth linear driving mechanism 222 can be a hydraulic cylinder, a pneumatic cylinder, a linear motor, a crank and connecting rod mechanism driven by a motor, or the like. The flipping mechanism 223 can be a device capable of urging its output shaft to reciprocate within a certain angle range, such as a pneumatic rotary actuator (which reversibly rotates) or a reversible motor.

In the embodiment shown in FIG. 4, the sliders 242 have first inclined surfaces 242b, and the box bodies 212 have second inclined surfaces 212b. When the sliders 242 returns from the material taking area 22a of the food material taking and placing unit 22 to below the stock bins 211, the box bodies 212 can slide to the top portions of the sliders 242 under the action of the first inclined surfaces 242b and the second inclined surfaces 212b.

The working principle of the material adding device 2 will be described below. Under the action of the control device 5, the cup falling holder 25 releases the second cup bodies so that the second cup bodies fall into a limiting hole of the bracket 232, and next the first linear driving mechanism 231 conveys both the bracket 232 and the second cup bodies to the material placing area 22b of the food material taking and placing unit 22, then the third linear driving mechanism 241 drives the sliders 242 and the box bodies 212 carried thereby to separate from the stock bins 211 and then leave away from the stock bins 211 until both the sliders 242 and the second cup bodies enter into the material taking area 22a of the food material taking and placing unit 22. When the second cup bodies enter into the material taking area 22a and also enter between the first top block 224 and the second top block 225, the fourth linear driving mechanism 222 drives the first top block 224 through the flipping mechanism 223 to move toward the second top block 225 and urges the first top block 224 and the second top block 225 to jointly clamp the box bodies 212. Next, the second linear driving mechanism 226 drives the flip-type clamping assembly and the box bodies 212 to move from the material taking area 22a to the material placing area 22b. Then, the flipping mechanism 223 drives the first top block 224 to rotate, and urges the box bodies 212 clamped by the first top block 224 and the second top block 225 to flip so as to pour the chewing ingredients in the box bodies 212 into the second cup bodies. Finally, the fourth linear driving mechanism 222 drives the first top block 224 through the flipping mechanism 223 to move away from the second top block 225, and urges the first top block 224 and the second top block 225 to release a clamping effect on the box bodies 212 so as to allow the box bodies 212 to fall freely and be captured by a preset capturing component. In order to facilitate next use, the second linear driving mechanism 226 also needs to drive the flip-type clamping assembly to return to the material taking area 22a, and the first linear driving mechanism 231 also needs to drive the bracket 232 (without the second cup bodies) to return to below the cup falling holder 25.

The working process of the instant beverage production equipment 100 according to the embodiment of the present disclosure will be described in detail below.

When a customer orders an instant beverage through a smart terminal device such as a mobile phone or ipad, the smart terminal device generates an order matching therewith, and sends the order to the control device 5 through mobile Internet or wireless communication. The control device 5 can coordinately control the preparing device 1, the material adding device 2 and the conveying device according to the received order to jointly produce the instant beverage that matches with the order. The specific process is as follows:

The preparing device 1, under the control of the control device 5, prepares drinking ingredients of the instant beverage in a first cup body.

During the preparation of the drinking ingredients by the preparing device 1, the material adding device 2, under the control of the control device 5, adds chewing ingredients of the instant beverage to a second cup body.

When the chewing ingredients have been added to the second cup body and the drinking ingredients in the first cup body have been prepared, the mechanical arm 3, under the control of the control device 5, pours the drinking ingredients from the first cup body into the second cup body so that the drinking ingredients and the chewing ingredients are mixed into the instant beverage.

After mixing, the mechanical arm 3, under the control of the control device 5, conveys the emptied first cup body into the cleaning machine 7 for cleaning so that it can be reused.

After cleaning, the mechanical arm 3, under the control of the control device 5, grabs the second cup body containing the instant beverage from the material adding device 2, and then conveys it to a cup sealing area of the cup sealing machine 4 for sealing.

After sealing, the mechanical arm 3, under the control of the control device 5, grabs the second cup body from the cup sealing area of the cup sealing machine 4, and then conveys it to a labeling area of the labeling machine 8 for labeling.

After labeling, the mechanical arm 3, under the control of the control device 5, grabs the second cup body from the labeling area of the labeling machine 8, and then conveys it to the storage space of the food taking cabinet 6 for temporary storage.

Finally, the customer can take away the instant beverage ordered thereby from the storage space of the food taking cabinet 6.

It should be noted that the instant beverage production equipment 100 according to the embodiment of the present disclosure can prepare not only instant beverages composed of drinking ingredients and chewing ingredients, but also beverages containing only drinking ingredients without chewing ingredients, for example, pure milk tea or brewed fruit juice. The material adding device 2 has the function of adding not only chewing ingredients, but also rock sugar, white sugar, tea, jelly, etc.

In the present disclosure, unless otherwise clearly specified and defined, terms "installed", "communicated", "connected", "fixed", etc. should be understood in a broad sense, for example, they may indicate fixed or detachable or integral connection; mechanical or electrical connection; direct communication or indirect communication through an intermediate medium; internal communication or interaction relationship between two components. For those of ordinary skill in the art, the specific meaning of the terms in the present disclosure can be understood according to specific circumstances.

In addition, terms "first", "second", etc. are used only for descriptive purposes, and cannot be understood as indicating or implying relative importance or implicitly indicating the number of indicated technical features. In the description of the present disclosure, "plurality" means two or more, unless otherwise specifically defined.

Finally, it should be noted that the above embodiments are used only to illustrate, instead of limiting, the technical solutions of the present disclosure. Although the present disclosure has been described in detail with reference to the embodiments, those of ordinary skill in the art should understand that: the technical solutions recorded in the embodiments can still be modified, or some or all of the technical features can be equivalently replaced, and these modifications or replacements do not cause the essence of corresponding technical solutions to deviate from the scope of the technical solutions according to the embodiments of the present disclosure, and shall be included in the scope of the claims and specification of the present disclosure. In particular, as long as there is no structural conflict, all technical features mentioned in the embodiments can be combined in any manner. The present disclosure is not limited to the specific embodiments disclosed herein, but includes all technical solutions falling within the scope of the claims.

What is claimed is:

1. Instant beverage production equipment, comprising:
   a preparing device, configured to prepare drinking ingredients of instant beverages in first cup bodies, or prepare drinking ingredients of instant beverages and add the prepared drinking ingredients into first cup bodies;
   a material adding device, configured to add chewing ingredients of the instant beverages into second cup bodies, wherein one of the second cup bodies and the first cup bodies are selling cup bodies, and the other are non-selling cup bodies;
   a conveying device, configured to pour the drinking ingredients or the chewing ingredients in the selling cup bodies into the non-selling cup bodies so that the drinking ingredients and the chewing ingredients are mixed into the instant beverages; and a control device, configured to coordinately control the preparing device, the material adding device and the conveying device.

2. The instant beverage production equipment of claim 1, wherein the control device comprises:
   a receiving module, configured to receive customer orders, and
   a processing module, configured to coordinately control the preparing device, the material adding device and the conveying device according to the orders to jointly produce the instant beverages matching with the orders.

3. The instant beverage production equipment of claim 1, further comprising:
   a cup sealing machine connected to the control device and configured to attach packaging films to cup rims of the selling cup bodies containing the instant beverages.

4. The instant beverage production equipment of claim 3, further comprising:
   a labeling machine connected to the control device and configured to attach selected labels to the selling cup bodies.

5. The instant beverage production equipment of claim 4, further comprising:
   a food taking cabinet connected to the control device and having storage space configured to accommodate the selling cup bodies containing the instant beverages.

6. The instant beverage production equipment of claim 5, wherein
   the conveying device is a mechanical arm, and
   the mechanical arm is configured to, under control of the control device, first grab the selling cup bodies containing the instant beverages from the material adding device, and then convey the grabbed selling cup bodies to a cup sealing area of the cup sealing machine, a labeling area of the labeling machine and the storage space of the food taking cabinet in sequence.

7. The instant beverage production equipment of claim 6, further comprising:
   a cleaning machine connected to the control device and configured to clean the non-selling cup bodies, wherein the control device is configured to control the mechanical arm to convey the non-selling cup bodies from which the drinking ingredients or the chewing ingredients have been poured to the cleaning machine.

8. The instant beverage production equipment of claim 6, wherein
   the preparing device comprises a stirrer, a first feeder and a second feeder;
   the mechanical arm is configured to, under the control of the control device, place the first cup bodies in a feeding area of the first feeder, a feeding area of the second feeder and a stirring area of the stirrer in sequence;
   in response to that the first cup bodies are placed in the feeding area of the first feeder, the control device controls the first feeder to add a first selected raw material of stored drinking ingredients into the first cup bodies;
   in response to that the first cup bodies are placed in the feeding area of the second feeder, the control device controls the second feeder to add a second selected raw material of the stored drinking ingredients into the first cup bodies; and
   in response to that the first cup bodies are placed in the stirring area of the stirrer, the control device controls the stirrer to mix the first selected raw material and the second selected raw material in the first cup bodies into the drinking ingredients.

9. The instant beverage production equipment of claim 1, wherein
   the material adding device comprises a storage unit, and a cup falling holder, a cup body conveying unit, a box body conveying unit and a food material taking and placing unit controlled by the control device;
   the cup falling holder is configured to store and release the second cup bodies;
   the cup body conveying unit is configured to receive the second cup bodies released by the cup falling holder and convey the received second cup bodies to a material placing area of the food material taking and placing unit;
   the storage unit comprises stock bins with box placing openings, and box bodies placed in the stock bins and configured to contain the chewing ingredients;
   the box body conveying unit is configured to take the box bodies out of box placing openings of the stock bins and convey the taken box bodies to a material taking area of the food material taking and placing unit; and
   the food material taking and placing unit is configured to convey the box bodies from the material taking area to the material placing area and pour out the chewing ingredients in the box bodies.

10. The instant beverage production equipment of claim 9, wherein the cup body conveying unit comprises a first linear driving mechanism, and a bracket driven by the first linear driving mechanism and configured to support the second cup bodies.

11. The instant beverage production equipment of claim 10, wherein the first linear driving mechanism is any one of a hydraulic cylinder, a pneumatic cylinder, a linear motor, and a crank and connecting rod mechanism driven by a motor.

12. The instant beverage production equipment of claim 9, wherein the food material taking and placing unit comprises a flip-type clamping assembly configured to control the box bodies, and a second linear driving mechanism configured to drive the flip-type clamping assembly to reciprocate between the material placing area and the material taking area.

13. The instant beverage production equipment of claim 12, wherein
   the flip-type clamping assembly comprises a groove-type member driven by the second linear driving mechanism, and a fourth linear driving mechanism, a flipping mechanism, a first top block and a second top block installed in a groove opening of the groove-type member;
   the second top block is rotatably connected with one inner side wall of the groove-type member;
   the fourth linear driving mechanism is connected with another inner side wall of the groove-type member;
   the first top block is connected with the fourth linear driving mechanism via the flipping mechanism;
   the fourth linear driving mechanism is configured to drive the first top block through the flipping mechanism to move toward the second top block and urge the first top block and the second top block to jointly clamp the box bodies; and
   the flipping mechanism is configured to drive the first top block to rotate and urge the box bodies clamped by the first top block and the second top block to flip.

14. The instant beverage production equipment of claim 13, wherein the second linear driving mechanism and the fourth linear driving mechanism are any one of a hydraulic cylinder, a pneumatic cylinder, a linear motor, and a crank and connecting rod mechanism driven by a motor; and the flipping mechanism is a pneumatic rotary actuator.

15. The instant beverage production equipment of claim 9, wherein the box body conveying unit comprises sliders configured to carry the box bodies, and a third linear driving mechanism configured to drive the sliders to take away the box bodies from the stock bins and convey the taken box bodies to the material taking area of the food material taking and placing unit.

16. The instant beverage production equipment of claim 15, wherein falling-off preventing members configured to prevent the box bodies from falling off from top portions of the sliders are provided on the top portions of the sliders.

17. The instant beverage production equipment of claim 16, wherein the falling-off preventing members are slots or magnets.

18. The instant beverage production equipment of claim 15, wherein
the sliders have first inclined surfaces, and the box bodies have second inclined surfaces; and
the box bodies are configured to, in response to that the sliders return from the material taking area of the food material taking and placing unit to below the stock bins, slide to the top portions of the sliders under action of the first inclined surfaces and the second inclined surfaces.

19. The instant beverage production equipment of claim 15, wherein the third linear driving mechanism is any one of a hydraulic cylinder, a pneumatic cylinder, a linear motor, and a crank and connecting rod mechanism driven by a motor.

* * * * *